United States Patent
Seume et al.

(10) Patent No.: US 6,202,401 B1
(45) Date of Patent: Mar. 20, 2001

(54) METHOD AND DEVICE FOR ACOUSTIC MODULATION OF A FLAME PRODUCED BY A HYBRID BURNER

(75) Inventors: Jörg Seume, Berlin; Nicolas Vortmeyer, Essen; Stephan Gleis, Stephanskirchen; Jakob Hermann, Oberweikertshofen; Dieter Vortmeyer, München, all of (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/263,329

(22) Filed: Mar. 5, 1999

Related U.S. Application Data

(63) Continuation of application No. PCT/DE97/01789, filed on Aug. 19, 1997.

(30) Foreign Application Priority Data

Sep. 5, 1996 (DE) .............................................. 196 36 093

(51) Int. Cl.$^7$ ....................................................... F02C 9/26
(52) U.S. Cl. .............................. 60/39.06; 60/725; 60/737; 431/114
(58) Field of Search ................................... 60/39.06, 725, 60/742, 39.281, 737; 431/1, 114

(56) References Cited

U.S. PATENT DOCUMENTS

| 4,589,260 | * | 5/1986 | Krockow ................................. 60/737 |
| 5,145,355 | * | 9/1992 | Poinsot et al. ........................... 431/1 |
| 5,349,811 | * | 9/1994 | Stickler et al. ...................... 60/39.06 |
| 5,428,951 | * | 7/1995 | Wilson et al. ....................... 60/39.06 |
| 5,706,643 | * | 1/1998 | Snyder et al. ....................... 60/39.06 |
| 5,791,889 | * | 8/1998 | Gemmen et al. .......................... 431/1 |
| 5,797,266 | * | 8/1998 | Brocard et al. .......................... 60/725 |

* cited by examiner

Primary Examiner—Ted Kim
(74) Attorney, Agent, or Firm—Herbert L. Lerner; Laurence A. Greenberg; Werner H. Stemer

(57) ABSTRACT

A method and a device for acoustic modulation of a flame through the use of an acoustically modulated feeding of a fuel. The flame is produced by burning the fuel in a hybrid burner including a premixing burner and a pilot burner associated with the latter. The fuel is fed to the premixing burner in a main flow and to the pilot burner in a pilot flow. The pilot flow is modulated and the main flow is not modulated. The invention is of particular interest for suppressing combustion oscillations in a combustion chamber to which the hybrid burner is connected.

6 Claims, 2 Drawing Sheets

METHOD AND DEVICE FOR ACOUSTIC MODULATION OF A FLAME PRODUCED BY A HYBRID BURNER

CROSS-REFERENCE TO RELATED APPLICATION

This application is a continuation of copending International Application No. PCT/DE97/01789, filed Aug. 19, 1997, which designated the United States.

BACKGROUND OF THE INVENTION

Field of the Invention

The invention relates to a method and a device for acoustic modulation of a flame through the use of an acoustically modulated feeding of a fuel, wherein the flame is produced by a hybrid burner including a premixing burner and a pilot burner associated with the latter, by burning the fuel which is fed to the premixing burner in a main flow and to the pilot burner in a pilot flow.

The invention relates, in particular, to a method and a device used in a gas turbine in order to affect combustion in the gas turbine with the hybrid burner. That influence takes place, in particular, in order to suppress combustion oscillations in the gas turbine. Combustion oscillations in general are acoustic oscillations which are excited by the combustion itself in a combustion system that is capable of acoustic oscillations. Combustion oscillations should certainly be distinguished from acoustic noise, which can be observed in any sort of combustion system. There is scarcely any flame which is relevant on a technical scale from which no clearly perceptible noise emanates. In contrast with noise, which of its nature contains acoustic signals with frequencies on a comparatively large bandwidth, a combustion oscillation is characterized by a very limited frequency spectrum. In a combustion system in a gas turbine, a combustion oscillation usually has a frequency between approximately 10 Hz and a few kHz. Since a combustion system is frequently of very complicated construction in an industrial system, it is virtually impossible to forecast combustion oscillations with respect to their occurrence and with respect to their frequencies. As a rule, such a forecast already fails because it is impossible to detect the limits of that oscillatory structure which determines the frequency of the oscillations. Consequently, people of relevant experience and responsibility depend on experiments and other empirical measures in avoiding combustion oscillations in combustion systems.

A hybrid burner of the present decisive type is disclosed in European Patent EP 0 193 838 E1 and in ASME publications 90-JPGC/GT-4 and 94-GT-46. The ASME publications also contain many references to the operation of the hybrid burner. The hybrid burner includes a premixing burner, that supplies the predominant component of the heat which can b e produced through the use of the hybrid burner, and in which the fuel and the air, provided for combustion, are intensively mixed with one another, before combustion is initiated. The combustion proceeds with excess air, that is to say the air provided contains more oxygen than is required for complete combustion of the fuel. It may be noted that that is a characteristic of any industrially important combustion system, in particular the combustion system in gas turbines. A pilot burner is provided in the hybrid burner in order to stabilize the combustion proceeding with excess air. The pilot burner is configured in such a way that it operates stably under all conceivable conditions and is constructed, in particular, as a diffusion burner in which the fuel does not mix with air at a substantial distance in time before the actual combustion. Rather, the oxygen penetrates from the air through diffusion into the finely distributed fuel, and the resulting mixture is ignited without a substantial time delay. The pilot burner supplies only a subordinate component of the heat to be produced overall, and thus at most contributes partially to undesired emissions of the hybrid burner, for example nitrogen oxides, irrespective of its construction and mode of operation. It is of principal importance that the pilot burner initiates and stabilizes combustion of the mixture emerging from the premixing burner, and ensures complete combustion of the fuel supplied under all conceivable operating conditions.

European Patent Application EP 0 601 608 A1 and the following articles: "Initiation and Suppression of Combustion Instabilities by Active Control", by T. Poinsot et al., in the $22^{nd}$ International Symposium on Combustion, Seattle, Wash., 1988, and the Journal of Propulsion and Power 6 (1990) 324, by P. J. Langhorne et al., provide references to how it is possible for a flame supplied by a burner to be modulated as desired with regard to suppressing combustion oscillations or with regard to other purposes, as well as references to devices and systems which can be appropriately used. A common feature of all of the known methods for modulating a flame, including the "method for active oscillation control" is that those methods have been developed only with an evaluation of the results of experiments on a system set up on a laboratory scale, but not on actual industrial combustion systems. One of the known methods provides for an acoustic wave in a combustion chamber to be extinguished by overlapping an appropriately generated antiphase wave of equal frequency by acoustic irradiation of the combustion chamber with the aid of suitable loudspeakers. Another known method employs modulation of the liquid or gaseous fuel fed to the combustion system. Such modulation is possible, since a combustion oscillation is characterized by a simultaneous and coordinated occurrence of an acoustic oscillation and an oscillating release of heat in the flame. Since the flame supplies the energy for maintaining the acoustic oscillation, a suitable modulation of the fuel flow reaching the flame, and thus of the flame itself, can be used to influence the acoustic oscillation, in particular to damp it. The modulation can be performed, for example, in such a way that the fuel is fed to the flame in an oscillating manner. An actuator which is suitable therefor is described in the above-mentioned European Patent Application EP 0 601 608 A1.

A particular problem arises if the quantity of fuel fed to a combustion system per unit of time is comparatively high, as is the case, for example, with a stationary gas turbine for outputting mechanical power of between 100 MW and 250 MW. Under some circumstances, the modulation of a fuel flow of a corresponding size can require an actuator of a size which is not currently available commercially.

SUMMARY OF THE INVENTION

It is accordingly an object of the invention to provide a method and a device for acoustic modulation of a flame produced by a hybrid burner, which overcome the hereinafore-mentioned disadvantages of the heretofore-known methods and devices of this general type in such a way that it is possible for the flame being produced to be acoustically modulated by using simple measures.

With the foregoing and other objects in view there is provided, in accordance with the invention, a method of acoustic modulation of a flame by acoustically modulated feeding of a fuel, which comprises producing a flame in a combustion chamber in which acoustic oscillations prevail, by burning a fuel with a hybrid burner having a premixing burner and a pilot burner associated with the premixing burner; feeding the fuel to the premixing burner in an unmodulated main flow and to the pilot burner in a modulated pilot flow; generating a sensor signal truly reproducing the acoustic oscillations; generating from the sensor signal a modulation signal modulating the pilot flow; and affecting negative feedback to the acoustic oscillations in the combustion chamber with the flame.

The invention proceeds from the finding, obtained with the aid of experiments, that important characteristics of a flame generated by a hybrid burner, for example the rate of production of carbon monoxide, the length, the distance from the burner and the stability under variation in the fuel being fed, can vary substantially even due to small variations in the pilot flow of fuel fed to the pilot burner, which can amount to less than 1% of the fuel fed overall to the hybrid burner. This points to the further finding that the pilot burner has a disproportionate effect on the flame produced overall by the hybrid burner, and the invention concludes from this that only the pilot flow, that is to say the flow of the fuel fed only to the pilot burner, need be modulated in order to modulate the flame that is generated overall. Consequently, the use of small and compact actuators for modulating the flame of a hybrid burner which develops a comparatively high thermal power is being developed, and thus there is also a development of the possibility, associated with the small and compact actuators, of modulating the flame of the hybrid burner at a relatively high frequency. The flame can be modulated in such a way that the actuator used as a modulator modulates the pilot flow so that the fuel enters the pilot burner in a manner oscillating over time.

The detailed configuration of the actuator used as a modulator is of minor significance for the invention. Again, details of the hybrid burner are of secondary importance, at most.

The developments according to the invention open up the application of the invention to the suppression of combustion oscillations in the combustion chamber, since acoustic oscillations in the combustion chamber are damped by the negative feedback, and a reinforcing effect which occurs without the modulation and is caused by the flame is thereby counteracted. It is clear from general experience that given such negative feedback the broadband acoustic noise in a combustion chamber can be at most reduced, but not excluded. The reason for this is, not the least, an additional noise which emanates from the sensor, the modulator and all of the devices which are connected between the sensor and the modulator. Consequently, there are always acoustic oscillations in the combustion chamber, and there is thus always a modulation of the pilot flow derived from these oscillations within the scope of the outlined development of the method. Once again, details of the configuration of the sensor are at most of secondary importance. As a rule, the sensor will be a fluctuating-pressure sensor, for example a dynamic fluctuating-pressure sensor of the type of a dynamic microphone, which is connected in a suitable way to the combustion chamber and which supplies a sensor signal in the form of an electromagnetic signal.

The sensor signal is fed to the modulation device which, for example, amplifies it, shifts its phase, if appropriate, and feeds it, likewise as an electromagnetic modulation signal, to the modulator, which is constructed in accordance with common practice as an electromagnetically operable actuator.

In accordance with another mode of the invention, the method is preferably applied to a hybrid burner which produces a flue gas that is fed to a turbine and is expanded therein. In this way, the application of the invention is developed on a gas turbine.

With the objects of the invention in view, there is also provided a device for acoustic modulation of a flame by acoustically modulated feeding of a fuel, comprising a combustion chamber; a hybrid burner connected to the combustion chamber for producing a flame in the combustion chamber by burning a fuel, the hybrid burner having a premixing burner and a pilot burner associated with the premixing burner; a main line feeding the fuel to the premixing burner; a pilot line feeding a pilot flow of the fuel through the pilot burner to the flame; a modulator disposed in the pilot line for permitting modulation of the pilot flow; a sensor connected to the combustion chamber for generating a sensor signal truly reproducing acoustic oscillations in the combustion chamber; and a modulation device connected to the sensor for receiving the sensor signal and for generating a modulation signal from the sensor signal, the modulation device connected to the modulator for transmitting the modulation signal to the modulator.

Substantial advantages of this device according to the invention follow from the preceding remarks regarding the method according to the invention, and reference is therefore made thereto.

The negative feedback development of the device is of particular interest for suppressing combustion oscillations in the combustion chamber, as already set forth.

In accordance with another feature of the invention, with regard to generating the modulation signal from the sensor signal, it is preferred for the modulation device to be setable in order to be able to effect a desired negative feedback to the acoustic oscillations in the combustion chamber.

It has already been stated that the sensor signal and the modulation signal are preferably electromagnetic. Consequently, the modulation device is preferably also a device for processing electromagnetic signals, that is to say an electronic circuit, in the final analysis. The modulation device can be constructed by using conventional electronic circuit engineering and can, in this case, include amplifiers, phase shifters and filters of a required type, interconnected as required. It can likewise be possible and, with regard to the possibly desirable combination of the modulation device with a control device, it can be advantageous, for the modulation device to be constructed with digital signal processors which are available in the meantime. The control device can, for example, control the production of heat by the hybrid burner and, in this regard, can be a control device for an entire gas turbine, for example. This has the advantage of permitting at least substantial parts of the processing of the sensor signal to form the modulation signal to be realized through the use of software, and this is more or less easy to insert in a total system, realized by software, for controlling the hybrid burner, or in a total system of which the hybrid burner is a component.

It goes without saying that the invention is not limited to the use of a single sensor and the processing of a single sensor signal. It can be desirable and advantageous to make use of a plurality of sensors which can well differ from one another for the purpose of imaging acoustic oscillations. The only important thing with regard to the sensor signal is that a true image of the acoustic oscillations should be produced, that is to say a sensor signal which can be multidimensional and permits a unique conclusion to be drawn concerning the acoustic oscillations in the combustion chamber. The modulation signal need not necessarily differ from the sensor signal, but it should in general be assumed that with regard to the signals emitted or fed, both the sensor and the modulator should have certain characteristics which must be matched to one another in some particular way.

In accordance with a further feature of the invention, the hybrid burner preferably belongs to a configuration composed of a plurality of similar hybrid burners, all of the hybrid burners are connected to a single combustion chamber, each hybrid burner has a pilot burner with an associated pilot line, and an associated modulator is inserted in each pilot line.

In accordance with a concomitant feature of the invention, it is applied in a gas turbine in which, in accordance with relevant practice, a plurality of hybrid burners are respectively provided on a combustion chamber.

The combustion chamber can optionally be a single combustion chamber, in particular one constructed as a circular annular combustion chamber, with it also being possible to provide a plurality of combustion chambers, operating in parallel, on a gas turbine. The latter is the case, in particular, if the combustion chambers are so-called silo combustion chambers. Other features which are considered as characteristic for the invention are set forth in the appended claims.

Although the invention is illustrated and described herein as embodied in a method and a device for acoustic modulation of a flame produced by a hybrid burner, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

The drawing is executed in a diagrammatic form for the purpose of bringing out certain features. Ideas regarding the particular realization of the embodiments represented therein will be available to a person of relevant experience and responsibility within the scope of his or her expert knowledge. Reference may be made, additionally, to the relevant references which are found in the quoted documents of the prior art.

DESCRIPTION OF THE PREFERRED EMBODIMENTS

Figure 1:
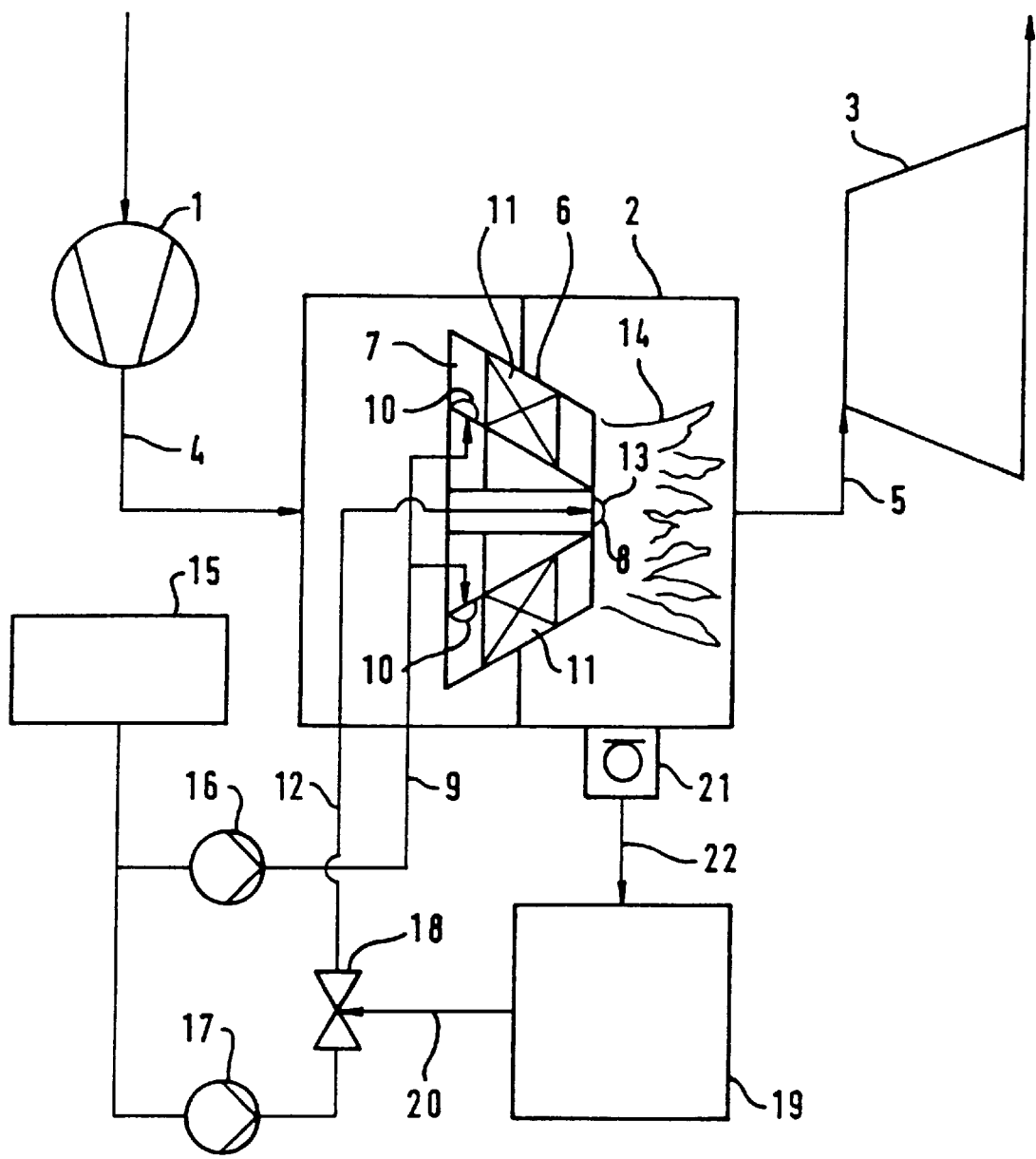
FIG. 1 is a diagrammatic and schematic representation of a gas turbine with a device for suppressing combustion oscillations.
Figure 2:
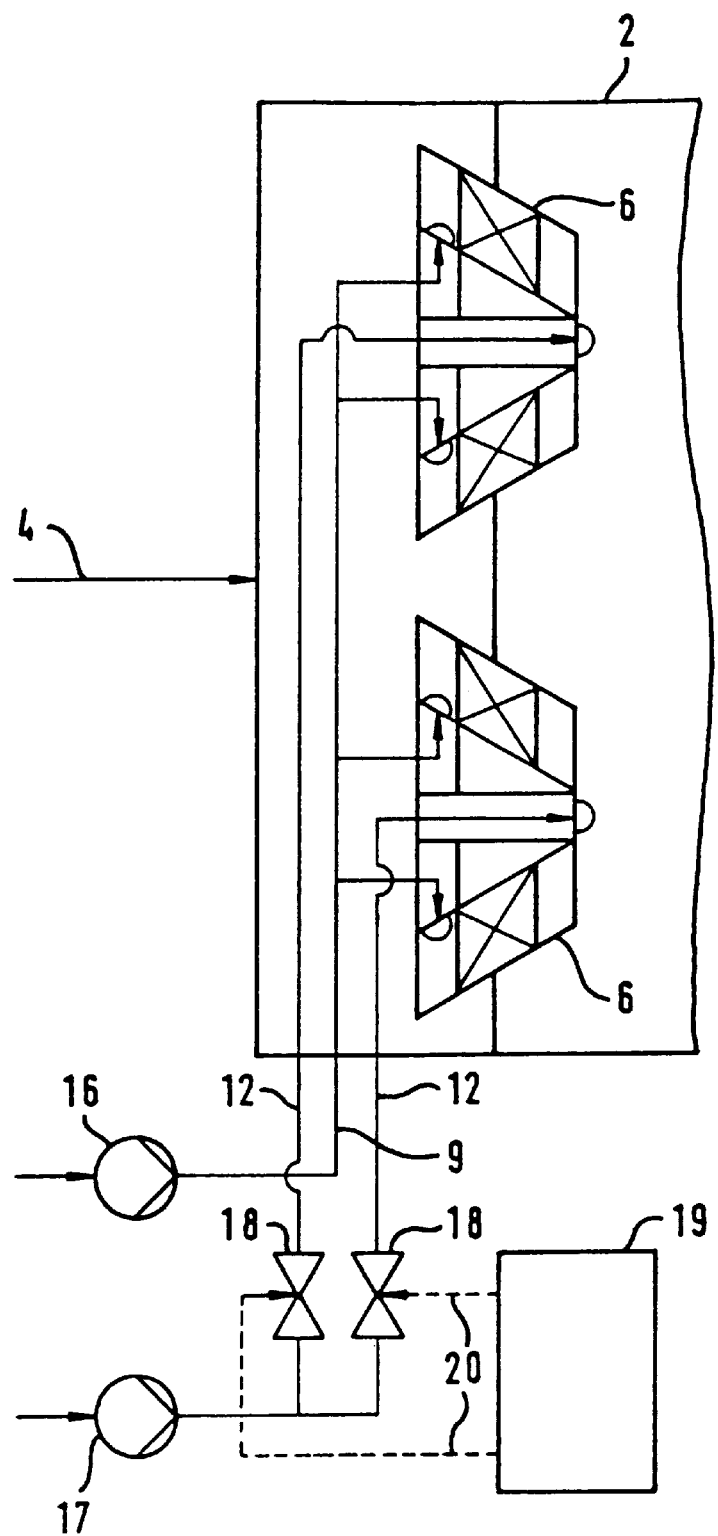
FIG. 2 is a fragmentary view of a combustion chamber with a plurality of hybrid burners, as well as a device for modulating flames produced by t he hybrid burners.

Referring now to the figures of the drawings in detail, it is seen that the systems represented therein have many features in common, and that the significance of many features of FIG. 2 follow from the explanation of FIG. 1. For this reason, features in the figures which correspond to one another respectively bear the same reference numerals.

FIG. 1 shows a gas turbine, including a compressor 1, a combustion chamber 2 (which, as explained, can be one of several), and a turbine 3. The compressor 1 provides an air flow 4 of compressed air, and the latter passes to the combustion chamber 2. A fuel is burned in the air flow 4 within the combustion chamber 2, and a flue gas which is produced is led to the turbine 3 as a flue gas flow 5 and expanded therein. A hybrid burner 6, which is provided for the purpose of burning the fuel, includes an annular premixing burner 7 which surrounds a pilot burner 8. A main line 9 is used to feed a main flow of the fuel to the premixing burner 7. Nozzles 10 are used to add the fuel to the part of the air flow 4 flowing through the premixing burner 7. In order to achieve mixing which is as homogeneous as possible, and to prevent ignition of the fuel directly at the nozzles 10 (flame kickback), provision is made for an eddying grid 11 which causes the part of the air flow 4 to eddy. The fuel cannot start to burn until downstream of the eddying grid 11. A pilot line 12 is used to feed a pilot flow of the fuel to the pilot burner 8, where the fuel can emerge at a nozzle 13 into the air flow 4. The pilot burner 8 is not configured as a premixing burner, but rather as a diffusion burner. The pilot burner 8 burns only a subordinate part of the fuel, with the aim being to stabilize the combustion of the fuel fed to the premixing burner 7. The hybrid burner 6 burns the fuel in a flame 14 projecting into the combustion chamber 2.

The fuel is prepared in a tank 15, and pumped through the use of a main pump 16 into the main line 9, or through the use of a pilot pump 17 into the pilot line 12. In order to achieve a desired modulation of the flame 14, a modulator 18, represented as a control valve, is inserted in the pilot line 12, and only in the pilot line 12. The modulator 18 can be used to modulate the pilot flow of the fuel in basically any desired way. Particular importance attaches to such a modulation for modulating the flame 14. The modulator 18 is controlled by a modulation device 19 which is connected to the modulator 18 through a modulation signal line 20. Reference is made herein to the preceding references for the configuration of the modulator 18, the modulation device 19 and the modulation signal line 20. The modulation of the pilot flow is of particular significance, in order to avoid combustion oscillations which may occur in the combustion chamber 2. For this purpose, a sensor 21, illustrated as a microphone, is attached to the combustion chamber 2. The sensor 21 is connected to the modulation device 19 through a sensor signal line 22. The modulation device 19 converts a signal obtained over the sensor signal line 22 to a modulation signal which passes through the modulation signal line 20 to the modulator 18. It is possible to effect negative feedback to the acoustic oscillations in the combustion chamber 2 through the modulation of the flame 14 by suitably processing the sensor signal in the modulation device 19. It is possible to reliably avoid combustion oscillations in the combustion chamber 2 by a suitable configuration of this negative feedback.

It may be pointed out that the device represented in FIG. 1 for modulating the flame 14 in no way excludes the realization of further measures on the combustion chamber 2 which relate to the suppression of combustion oscillations therein. It can, for example, be of interest to construct the combustion chamber 2 and all of the components connected thereto in such a way that combustion oscillations are excluded in any case whenever the combustion chamber 2 operates while producing the maximum envisaged thermal power. Such a construction does not exclude the occurrence of combustion oscillations if less than the maximum envisaged thermal power is produced in the combustion chamber. The device for suppressing combustion oscillations presented in FIG. 1 can then be used to effectively reduce the combustion oscillations or suppress them entirely. It is advantageous in this case that the modulator 18 is not permanently stressed, and this effectively reduces its wear.

FIG. 2 shows a combustion chamber 2 with hybrid burners 6 which are essentially of the same construction as the hybrid burner in FIG. 1. Their construction is therefore not explained in detail once again. The combustion chamber 2 is likewise fed an air flow 4, which is mixed in the hybrid burners 6 with fuel that is burned in the combustion chamber 2. A single main line 9, which branches appropriately to the hybrid burners 6 from the main pump 16, is provided for feeding the fuel to the premixing burners 7. In contrast, a dedicated pilot line 12 is provided for each hybrid burner 6 and an associated modulator 18 is inserted in each pilot line 12. The pilot lines 12 are brought together upstream of the modulators 18 and fed with fuel from a single pilot pump 17. Each modulator 18 is connected to the modulation device 19 through an associated modulation signal line 20. The modulators 18 need not necessarily be operated in step. It is possible, and maybe advantageous, for each modulator 18 to be fed a particular modulation signal which deviates from the modulation signal fed to the other modulator 18. This is of particular interest whenever combustion oscillations are formed in the combustion chamber 2 in the form of standing waves which have different amplitudes at the locations of the hybrid burners 6 and which are influenced in a different way by the hybrid burners 6. It may be advantageous in this regard to also make use of a plurality of sensors 21 and to evaluate the sensor signals emitted thereby in an appropriately differentiated manner.

The fact that, in accordance with FIG. 2, only a single main pump 16 and a single pilot pump 17 are used, is in no way mandatory, and is represented in that way only for the sake of clarity. It is possible to provide separate pumps 16 and 17 for each hybrid burner 6. It is also possible to provide all premixing burners 7 and all pilot burners 8 with fuel from a single pump. Of course, it is also necessary under these circumstances to ensure that the fuel is distributed as desired across the various burners by providing chokes.

The above-described exemplary embodiments are constructed for the use of a liquid fuel. However, this is not associated with any critical statement with regard to the use of gaseous fuel in connection with the invention. Instead, such elements of the exemplary embodiments which have to be specifically matched to the conveyance of liquid fuel are to be regarded as symbols for analogous elements for conveying gaseous fuel. In other words, pumps may be replaced by blowers, the actuator for liquid may be replaced by an actuator for gas, the tank for a gas accumulator may be replaced by a gas supply network, etc.

The invention relates to a method and a device for acoustic modulation of a flame produced by a hybrid burner, that utilizes an amplification effect observed for such hybrid burners, in which variations during operation of the associated pilot burner have a disproportionate effect on the operation of the associated premixing burner. Consequently, a desired modulation of the flame can be achieved by feeding only a subordinate part of the fuel fed overall to the hybrid burner in an appropriately modulated manner.

We claim:

1. A method of acoustic modulation of a flame by acoustically modulated feeding of a fuel, which comprises:

producing a flame in a combustion chamber in which acoustic oscillations prevail, by burning a fuel with a hybrid burner having a premixing burner and a pilot burner associated with the premixing burner;

feeding the fuel to the premixing burner in an unmodulated main flow and to the pilot burner in a modulated pilot flow;

generating a sensor signal truly reproducing the acoustic oscillations;

phase-shifting the sensor signal to produce a modulation signal modulating the pilot flow; and effecting negative feedback to the acoustic oscillations in the combustion chamber with the flame by adjusting said phase-shifting.

2. The method according to claim 1, which comprises producing a flue gas with the hybrid burner, feeding the flue gas to a turbine, and expanding the flue gas in the turbine.

3. A device for acoustic modulation of a flame by acoustically modulated feeding of a fuel, comprising:

a combustion chamber;

a hybrid burner connected to said combustion chamber for producing a flame in said combustion chamber by burning a fuel, said hybrid burner having a premixing burner and a pilot burner associated with said premixing burner;

a main line feeding the fuel to said premixing burner;

a pilot line feeding a pilot flow of the fuel through said pilot burner to the flame;

a modulator disposed in said pilot line for permitting modulation of the pilot flow;

a sensor connected to said combustion chamber for generating a sensor signal truly reproducing acoustic oscillations in said combustion chamber; and a modulation device connected to said sensor for receiving the sensor signal and for generating a modulation signal by phase-shifting the sensor signal, said modulation device connected to said modulator for transmitting the modulation signal to said modulator.

4. The device according to claim 3, wherein said modulation device can be set to effect negative feedback to the acoustic oscillations in said combustion chamber.

5. The device according to claim 3, wherein said hybrid burner is part of a configuration having a plurality of similar hybrid burners each connected to said combustion chamber, each having a respective pilot burner and each connected to a respective pilot line having a respective modulator.

6. The device according to claim 3, wherein said hybrid burner is connected to a gas turbine.

\* \* \* \* \*